United States Patent [19]

Hashimoto

[11] Patent Number: 4,745,495
[45] Date of Patent: May 17, 1988

[54] EASILY OPERABLE RECORDING/REPRODUCING APPARATUS OF DOUBLE CASSETTE TYPE

[75] Inventor: Kazuo Hashimoto, Tokyo, Japan

[73] Assignee: Hashimoto Corporation, Tokyo, Japan

[21] Appl. No.: 48,498

[22] Filed: Apr. 29, 1987

Related U.S. Application Data

[63] Continuation of Ser. No. 857,766, Apr. 29, 1986, abandoned.

[30] Foreign Application Priority Data

Apr. 30, 1985 [JP] Japan .................. 60-93204

[51] Int. Cl.⁴ .............................................. G11B 15/10
[52] U.S. Cl. ...................................... 360/13; 360/69; 360/137
[58] Field of Search ........................... 360/13, 18, 63

[56] References Cited

U.S. PATENT DOCUMENTS 4,596,901 6/1986 Hanscom et al. .................. 179/6.07

FOREIGN PATENT DOCUMENTS

55-70949 5/1980 Japan .................................. 360/137

Primary Examiner—Vincent P. Canney
Attorney, Agent, or Firm—Lowe, Price, LeBlanc, Becker & Shur

[57] ABSTRACT

An easily operable recording/reproducing apparatus of double cassette type having a master tape and a slave tape is disclosed, which is adapted to operate each of these tapes in a plurality of modes including recording, playing back, rewinding, and fast-forwarding modes. The recording/reproducing apparatus comprises a first operation button for operation of the master tape, a second operation button for operation of the slave tape, and a third operation button for dubbing operation from the master tape to the slave tape. A microprocessor is adapted to detect depressed buttons and a number of times of depression of each button, and controls so that each of the master tape and the slave tape is operated in operation mode in accordance with the detected result. When the third operation button is depressed, dubbing operation from the master tape to the slave tape is performed. When the second and third buttons are depressed simultaneously, recording on the slave tape is performed.

3 Claims, 10 Drawing Sheets

EASILY OPERABLE RECORDING/REPRODUCING APPARATUS OF DOUBLE CASSETTE TYPE

This application is a continuation of application Ser. No. 857,766, filed Apr. 29, 1986, now abandoned.

CROSS REFERENCE TO RELATED APPLICATIONS

This application is related to copending applications Ser. Nos. 648,743, filed Sept. 10, 1984, and 853,409, filed Apr. 18, 1986.

BACKGROUND OF THE INVENTION

The present invention relates to a recording/reproducing apparatus, and more particularly to a so-called double cassette tape recorder, which is adapted to be easily operable.

Typically, conventional double cassette tape recorders comprise an operating mechanism for a master tape and another operating mechanism for a slave tape, and each of these mechanisms has at least four or five operation buttons. Therefore, users should properly operate about ten operation buttons in operating a conventional double cassette tape recorder of this kind, resulting in complex button operation and thus inconveniece to users.

SUMMARY OF THE INVENTION

An object of the present invention is to provide an easily operable recording/reproducing apparatus of a double cassette type, which is capable of eliminating the abovementioned drawback of conventional recording-/reproducing apparatuses, and is easily operable by ordinary or unskilled users.

Another object of the present invention is to provide an easily operable recording/reproducing apparatus of a double cassette type, which is adapted to operate each of a master tape and a slave tape by a corresponding single operation button, and to perform dubbing operations from the master tape to the slave tape by another operation button other than these two operation buttons.

According to the present invention, an easily operable recording/reproducing apparatus of a double cassette type having a master tape and a slave tape is provided.

The recording/reproducing apparatus comprises a first operation button for operation of the master tape, a second operation button for operation of the slave tape, and a third operation button for a dubbing operation from the master tape to the slave tape.

The first and second operation buttons each consist of a single button which is adapted to be repetitively depressed for selecting one of reproducing, rewinding, and fast-forwarding manual operations of the master and slave tapes, respectively. In one aspect of the invention has master and slave tapes are driven in playback, rewinding, and fast-forwarding modes as the corresponding operation button is depressed once, twice, and three times, respectively. When the third operation button is depressed, dubbing operation from the master tape to the slave tape is performed. When the second and third buttons are depressed simultaneously, recording operation on the slave tape is performed.

An advantage of the present invention resides in that operation of a double cassette tape recorder is simplified, so that each of a master tape and a slave tape is positively operable by a corresponding single operation button. Further, dubbing operation from the master tape to the slave tape is effected by a corresponding single button other than the above-mentioned two operation buttons, resulting in a recording/reproducing apparatus of a double cassette type having improved practicality.

BRIEF DESCRIPTION OF THE DRAWINGS

FIG. 2 consisting of FIGS. 2, 2A and 2B is a flowchart of a control program executed by a microprocessor of FIG. 1 for recording, playing back, rewinding and fast-forwarding operations of a master tape;

FIG. 3 consisting of FIGS. 3, 3A and 3B is a flowchart of a control program for various operations of a slave tape;

FIG. 4 consisting of FIGS. 4, 4A and 4B is a flowchart of a control program for recording, rewind erasure, and fast-forward erasure operations effected by sequential button operations; and FIG. 5 consisting of FIGS. 5, 5A and 5B is a flowchart of a control program for performing dubbing operation effected by a single finger motion.

DETAILED DESCRIPTION OF THE PREFERRED EMBODIMENT

With reference to FIGS. 1 through 5, a double-cassette-type recording/playing apparatus according to an embodiment of the present invention will now be explained.

Figure 1:
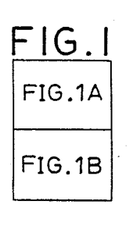
FIG. 1 consisting of FIGS. 1, 1A and 1B is a circuit diagram of a recording/reproducing apparatus according to an embodiment of the present invention.

Referring to FIG. 1, the recording/playing apparatus comprises a first operating button 1 for a first cassette (not shown) as a master tape, a second operating button 2 for a second cassette (not shown) as a slave tape, and a third operation button or a recording button 3 for setting each of the first and second cassettes individually in recording mode, and for performing dubbing operation from the first cassette to the second cassette. These buttons 1 to 3 are connected to data bus terminals DB0, DB2 and DB1 of a microprocessor (hereinafter referred to as a CPU) 30, which consists of an Intel 8049 in the present embodiment, through buffers G-1, G-3 and G-2, respectively, and are also connected to an interrupt terminal INT through a NOR gate G-4. Accordingly, as described later, an interrupt request is supplied to the CPU 30 through the terminal INT when one of the three operation buttons 1 to 3 is depressed once, or when two of them are depressed similtaneously or sequentially. The depressed button or buttons are then detected so that a control program enters a corresponding one of predetermined subroutines.

Connected to output ports P20 to P25 of CPU 30, through drivers G-5 to G-10, are solenoids and motors for driving the first and second cassettes, so that the first cassette is fast-forwarded when only motor M1 is driven. The same cassette is driven in PLAY mode when motor M1 and solenoid FWD.SD1 are energized simultaneously, and the first cassette is rewound when motor M1 and solenoid RW.SD1 are energized simultaneously.

Reference numerals 6 to 11 denote light-emitting diodes for indicating respective operating modes in which first and second cassettes are operated, respectively, synchronous switch 12 is turned ON for dubbing operations so that the first and second cassettes are rewound up to their start points, respectively, prior to initiation of dubbing operation, as described hereinbelow, and edit switch 13 is activated in dubbing operation so as to provide an edit function in a manner momentarily stopping the second cassette (slave tape) while the first cassette (master tape) is fast-forwarded past material to be skipped such as commercials.

Reference symbols RPH-1a and RPH-1b denote recording/playing heads for the first cassette, EH-1 an erase head for the first cassette, RPH-2a and RPE-2b recording/playing heads for the second cassette, EH-2 an erase head for the second cassette. Reference numeral 14 denotes a recording/playing switching circuit which accommodates therein a high-frequency bias circuit, and analog switches and relays for switching connections between these heads and input/output terminals of the switching circuit 14. Further, these recording/playing heads are arranged so that they are operable in recording mode when a P/R terminal of the circuit 14 is set at L level. The recording/playing heads for the first cassette are rendered operable in recording mode with a ½ terminal of the circuit 14 is set at L level, whereas the heads for the second cassette are operable in recording mode when the same terminal is set at H level. Further, circuit 14 comprises input terminals RIa, RIb for receiving signals to be recorded, and output terminals POa and POb for supplying signals to be reproduced. Reference numeral 15 denotes an input alteration switch for selecting an input signal to be recorded, 16 to 21 amplifiers, A-1 to A-8 analog switches each permitting a signal to flow therethrough in the direction shown by an arrow when a corresponding control terminal c is set at H level, 22 and 23 loudspeakers, and +B a power source.

In the following, operation of the recording/playing apparatus constructed as above will be explained with reference to FIGS. 2 through 5. In the Figures, switch status is represented numerically with a "0" value indicating that a switch has not been depressed, and a "1" indicating that a switch has been depressed. The status of switches 1, 2 and 3 are represented by the third, first and second digits of the three digit data groups, respectively, reading from left to right.

In order to set the first cassette (master tape) in recording mode, the user depresses the first and third operation buttons 1 and 3 simultaneously after switching the input alteration switch 15 (FIG. 1) to its corresponding switching position. As a result, an interrupt request is supplied to the CPU 30 through the NOR gate G-4 and the interrupt terminal INT of the CPU 30.

Figures 2, 2A:
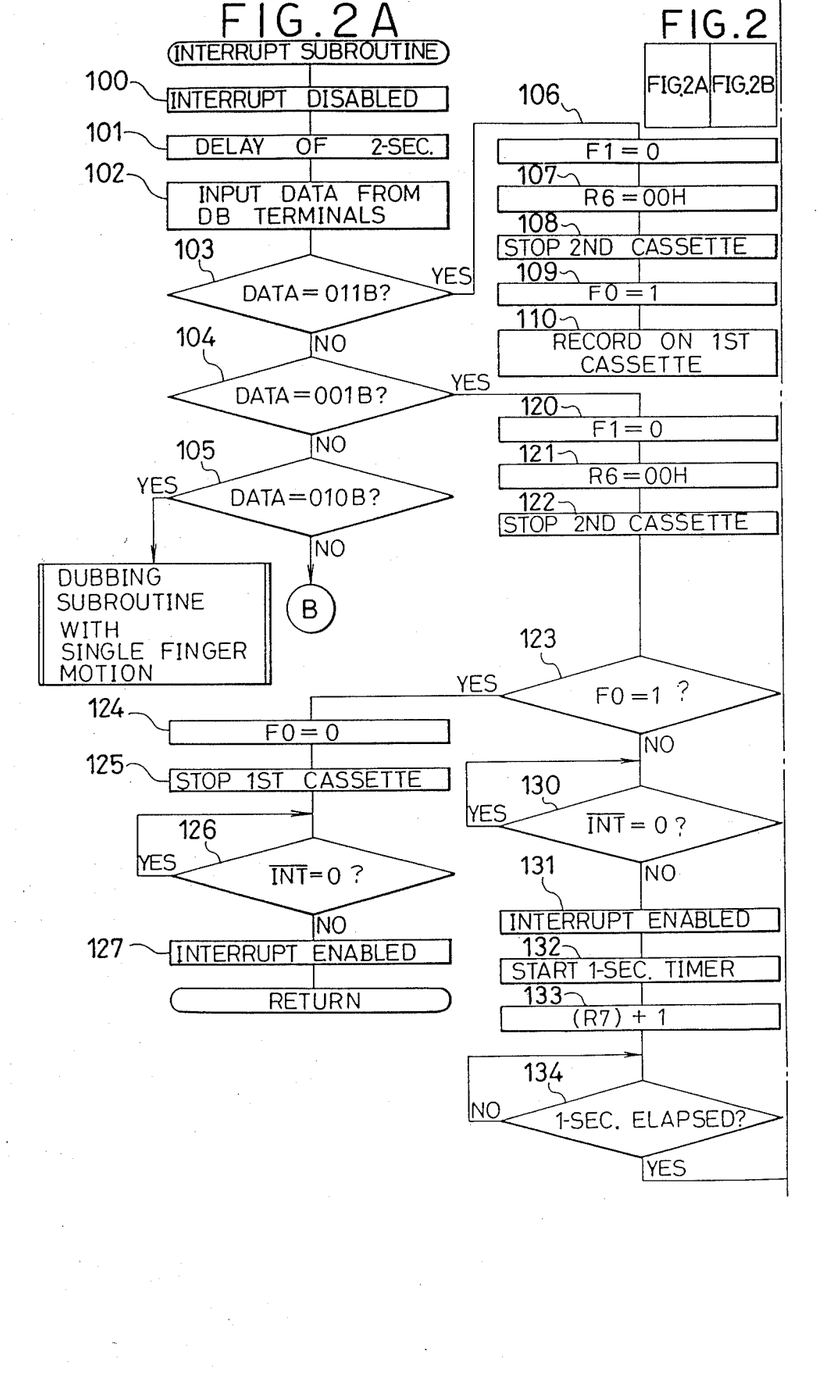
Figure 2B:
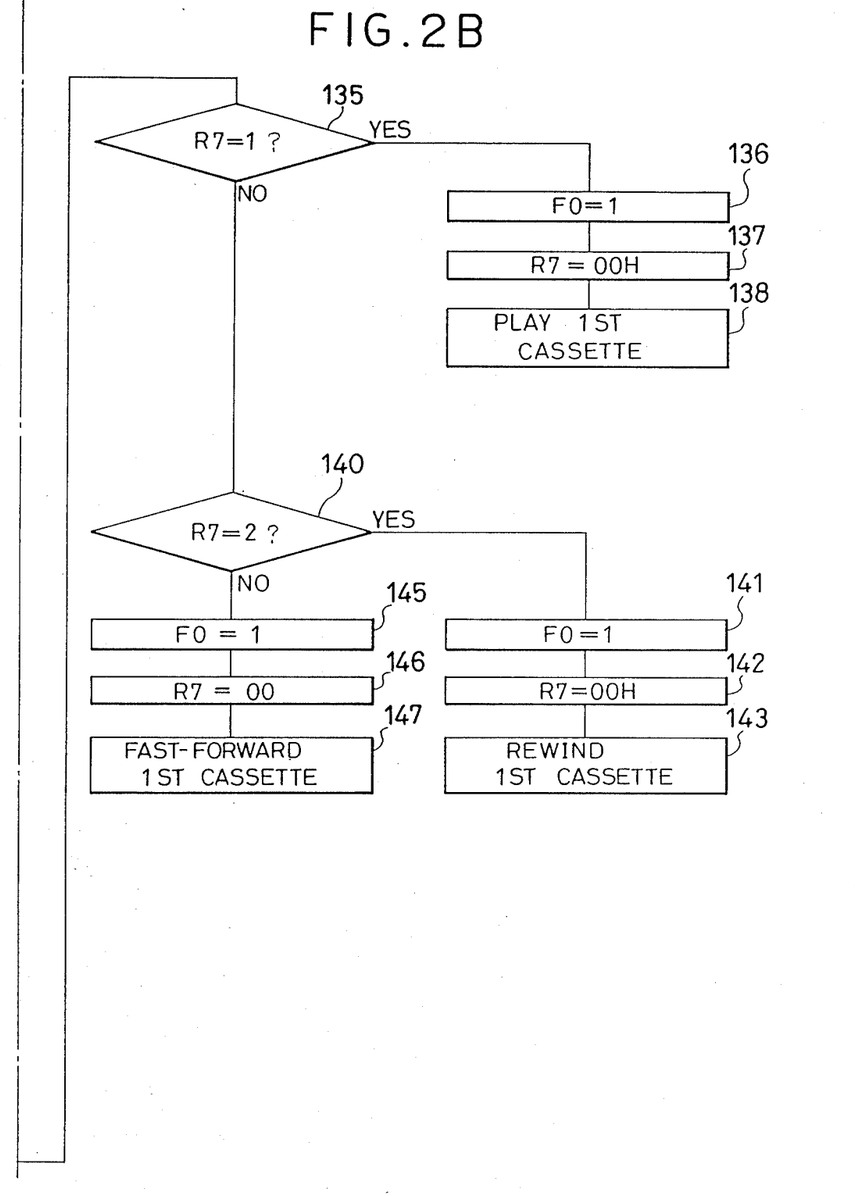

First, the CPU 30 is disables interrupts at step 100 in FIG. 2, and provides a 0.2 second time delay at step 101. Signals are received from the data bus terminals DB0, DB1 and DB2 (step 102) to detect which of the operation buttons 1 to 3 is or are depressed, so as to test the thus received signals or coded data at step 103.

When operation buttons 1 and 3 are depressed simultaneously, the coded data "011B" appears at the terminals DB0 to DB2 and thus the control program advances from step 103 to step 106 to clear F1 flag to logic "0". In the meantime, the Intel 8049 constituting the CPU 30 is provided therein with F0 and F1 flags. In this embodiment, these flags are used such that the F0 and F1 flags are set to logic "1" to indicate first and second cassettes being driven, respectively, and hence for indexes for automatically stopping one of these cassettes when driving operation is switched from one cassette to another. A register is used as an alternative to a flag and in addition to the F0 and F1 flags, to supply a deficiency in monitoring the status of the appratus, which occurs when only the F0 and F1 flags are utilized.

Next, at step 107, a R6 register is cleared, which is employed as a counter for counting a number of times of depression of the operation button 2 for the second cassette. At subsequent step 108, the second cassette is stopped. Upon depression of the operation button 1 for the first cassette, the CPU 30 sets the output ports P23 to P25 at H level (logic "1") to render the motor M2 and the solenoids FWD.SD2, RW.SD2 inoperative, so as to automatically terminate driving operation of the second cassette even when the same cassette is driven in any one of recording, playing, rewinding modes, etc. Next, the F0 flag is set at "1" to store that the first cassette is being driven (step 109), and then the first cassette is driven in recording mode (step 110). More specifically, in the arrangement shown in FIG. 1, the CPU 30 sets the output ports P20 and P22 at logic "1" to drive the first cassette at a normal speed, and sets the output port P16 at logic "0" to operate in recording mode the recording/playing switching circuit 14 which is connected to the ports P16 at its input terminal P/R. Further, the output port P17 is set at logic "1" to operate the heads RPH-1a, RPH-1b and EH-1 for the first cassette in recording mode, and the output ports P10 and P13 are set at logic "1" to activate the analog switches A-1 and A-5 so that an output from an external source such as a radio receiver (not shown), for example, is received through the input alteration switch 15 to the recording amplifiers 16 an 19, respectively. Then, outputs from the amplifiers 16, 19 are supplied to the heads for the first cassette through the input terminals RIa and RIb, to be recorded on the first cassette.

There are two possible ways to terminate the recording mode operation of the first cassette. That is, on one hand, such operation is automatically terminated upon depression of the operation button 2 for another cassette, and, on the other hand, the cassette 1 is stopped by depressing operation button 1 a second time. In the case of the first cassette, when the first operation button 1 is depressed again, an interrupt request is supplied to CPU 30 and the control program advances to step 104 through steps 100 to 103. At step 104, it is determined that the inputted coded data is consistent with the predetermined data "001B" and hence the program advances to step 120. At steps 120 through 122, if the second cassette is being operated, such operation is terminated as in the above-mentioned steps 106 to 108.

Next, CPU 30 tests the content of the F0 flag at step 123. Since this flag has been set at logic "1" at step 109, the answer in this step is affirmative (YES) and thus the program processed to step 214 to clear the F0 flag, and then the first cassette is stopped (step 125). At subsequent step 126, the CPU 30 tests whether the interrupt terminal INT is set at logic "0" (H level), to determine, whether any one of the operation buttons 1 through 3 is kept depressed. Upon release of the depressed button, CPU 30 enables interrupts (step 127) and exits from the routine of FIG. 2. Since the program causes CPU 30 to enable interrupts after the operation button is released as shown by steps 126 and 127, the control program never enters other routines. Although omitted in FIG. 2, the control program is so prepared that an interruption is allowed at step 110 upon release of the depressed operation button.

As will be understood from the following explanation, the recording/playing apparatus is so constructed that the first cassette is operated in its playing, rewind and fast-foward modes when the operation button 1 is depressed once, twice and three times, respectively, within a predetermined period of time.

More particularly, when the operation button 1 is depressed once, an interrupt request is supplied to the CPU 30 as mentioned above, and the program advances through steps 100 through 103 to step 104, wherein it is determined that the inputted data is consistent with the predetermined code, and then advances through steps 120–122 to step 123, wherein the content of the F0 flag is tested. As mentioned above, since the F0 flag is set at logic "0" when the first cassette is stopped, the program flows to step 130 to test whether or not the operation button remains depressed as in step 126. Upon release of the button, the CPU 30 enables interrupts at step 131, and causes a 1-second timer to start at step 132, and increments the stored value of a R7 register by +1 at step 133. Since the R7 register is already cleared upon supply of electric power to the arrangement of FIG. 1, the increment operation at step 133 causes R7 register have the value "1" stored indicating that the first operation button 1 is depressed once. If it is determined that 1 second has elapsed, with button 1 not having been depressed again, the program flows from step 135 to step 136 because the value of "1" is stored in the R7 register. At step 136, the F0 flag is set at logic "1" to indicate that the first cassette is rendered operative and, at step 137, the R7 register is cleared. Next, the first cassette is driven in playing mode at step 138.

On the other hand, in order to drive the first cassette in rewinding mode, the user releases the depressed button at step 130 to enable CPU 30 interrupts, and thereafter, depresses the button again within 1 second (step 134) and then release same. Upon release of the button, the value of "2" is stored in the R7 register at step 133. If 1 second has elapsed, with no button operation, the program proceeds through steps 134 and 135 to step 140, wherein it is determined that the value of "2" is stored in the R7 register. As a result, the F0 flag is cleared (step 141), and the R7 register is set to "00H" (step 142), and then the first cassette is rewound (step 143).

In order to effect fast-forward operation of the first cassette, after depressing the first operation button 1 twice, the user depresses the same button 1 before expiration of the 1 second time period at step 134, so that the program proceeds from step 140 to step 145 to set the F0 flag to logic "1". Then, the program advances to step 146 to set the R7 register to the code "00H", and to step 147 to perform fast-forward operation of the first cassette.

Figure 1A:
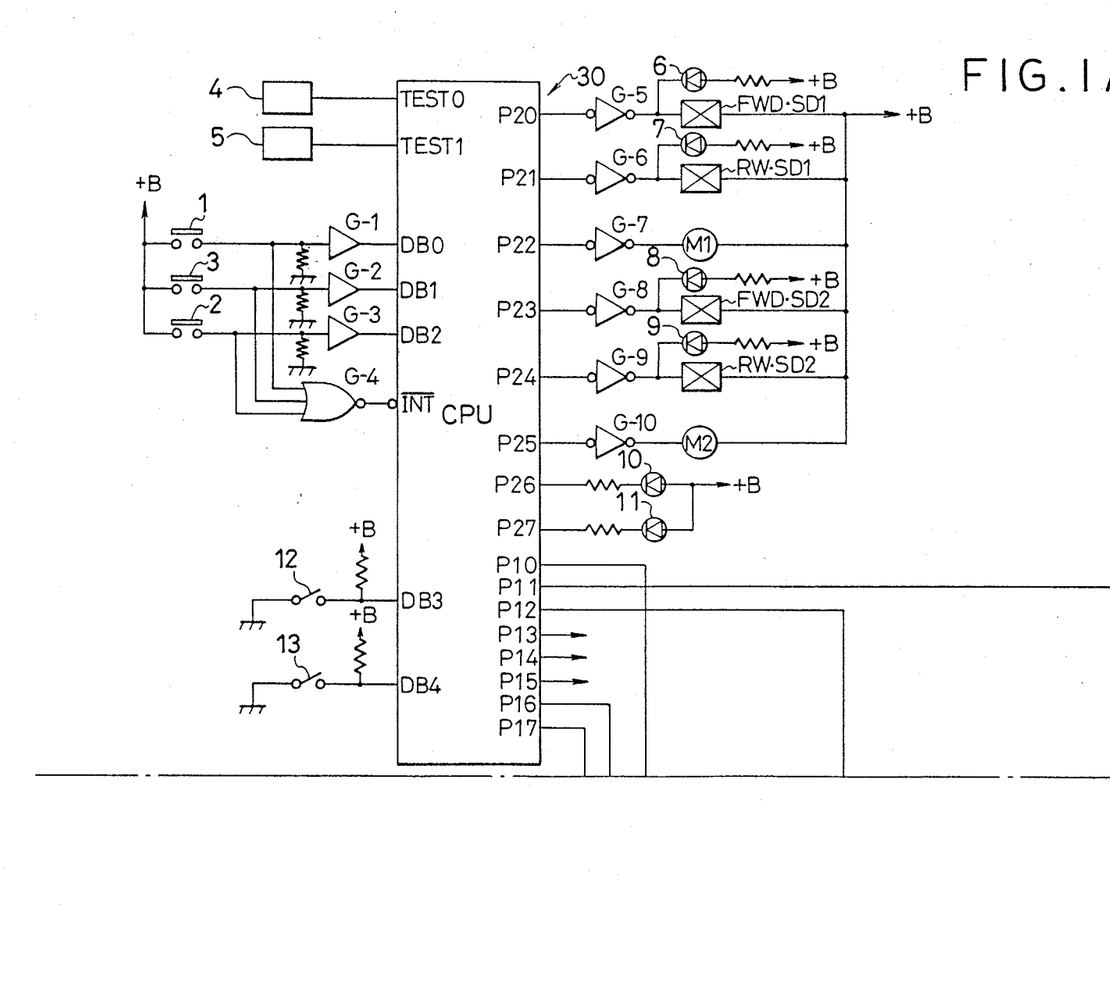
Figure 1B:
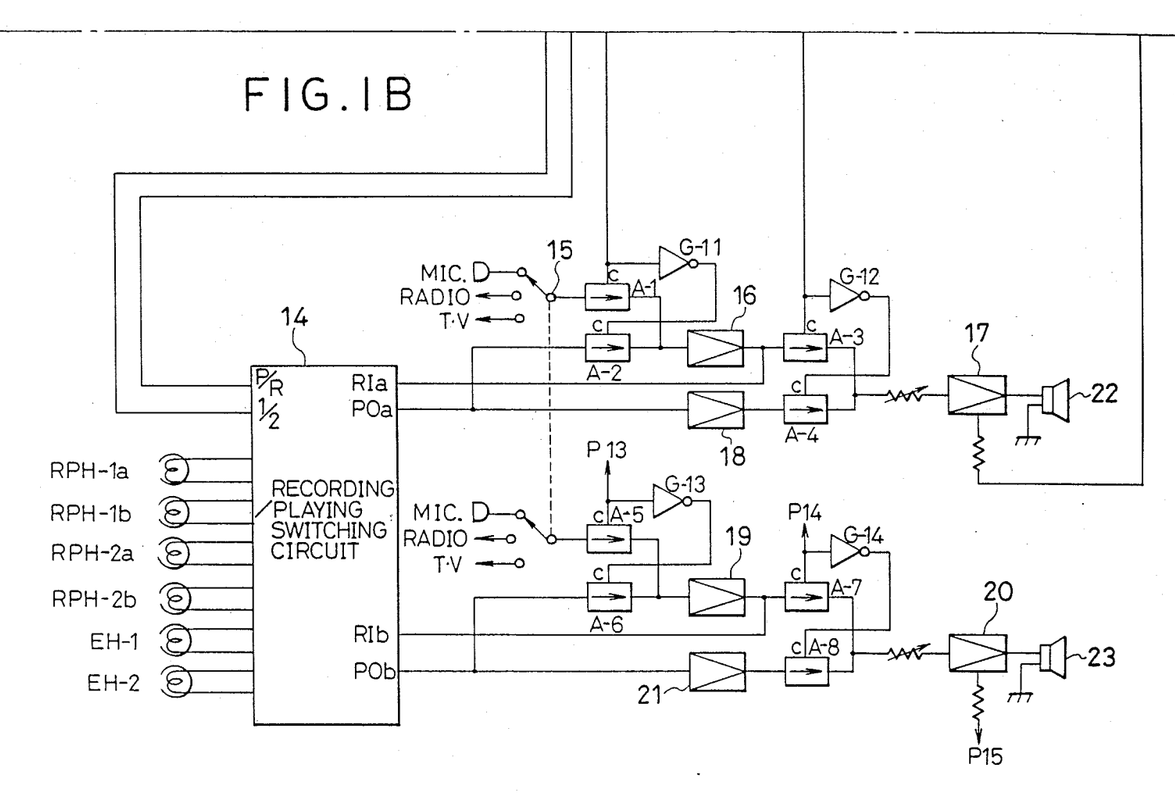
Figures 3, 3A:
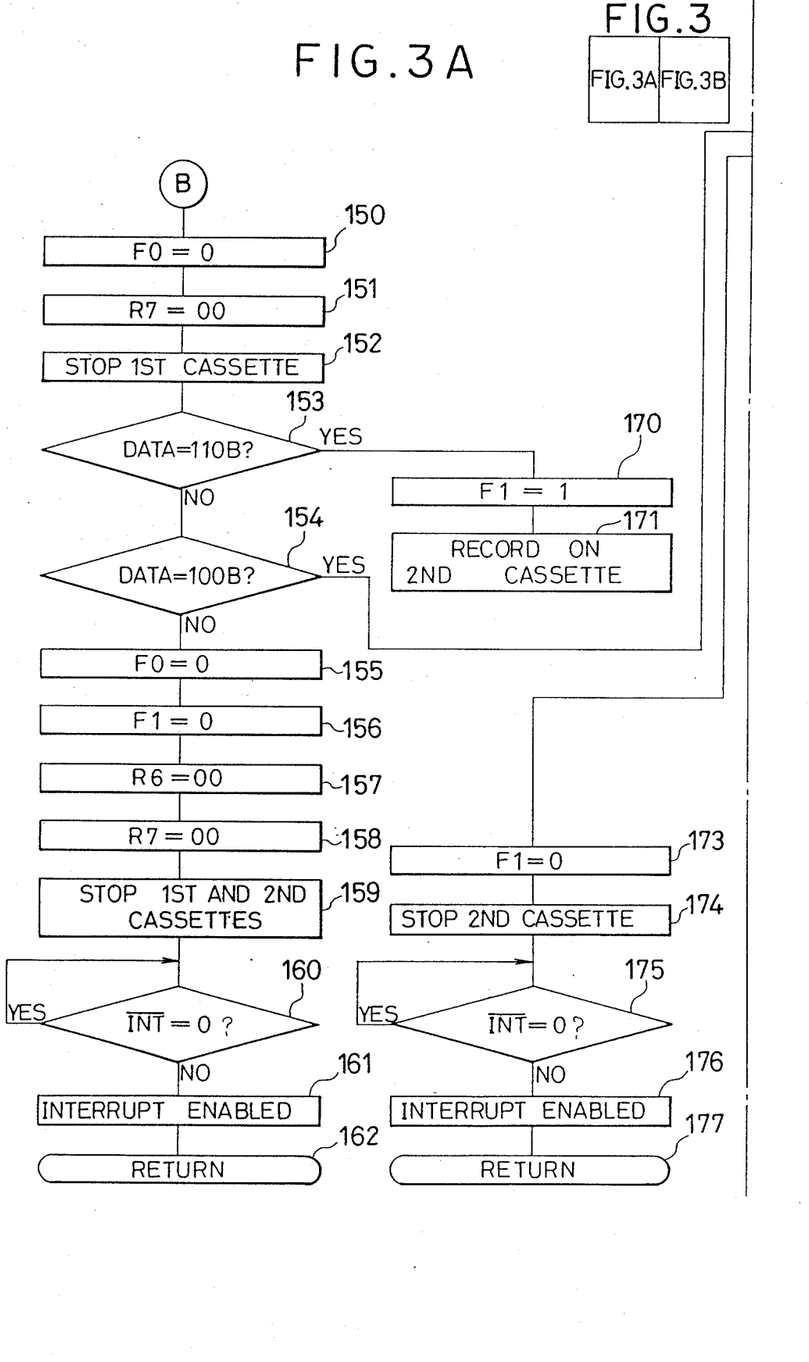
Figure 3B:
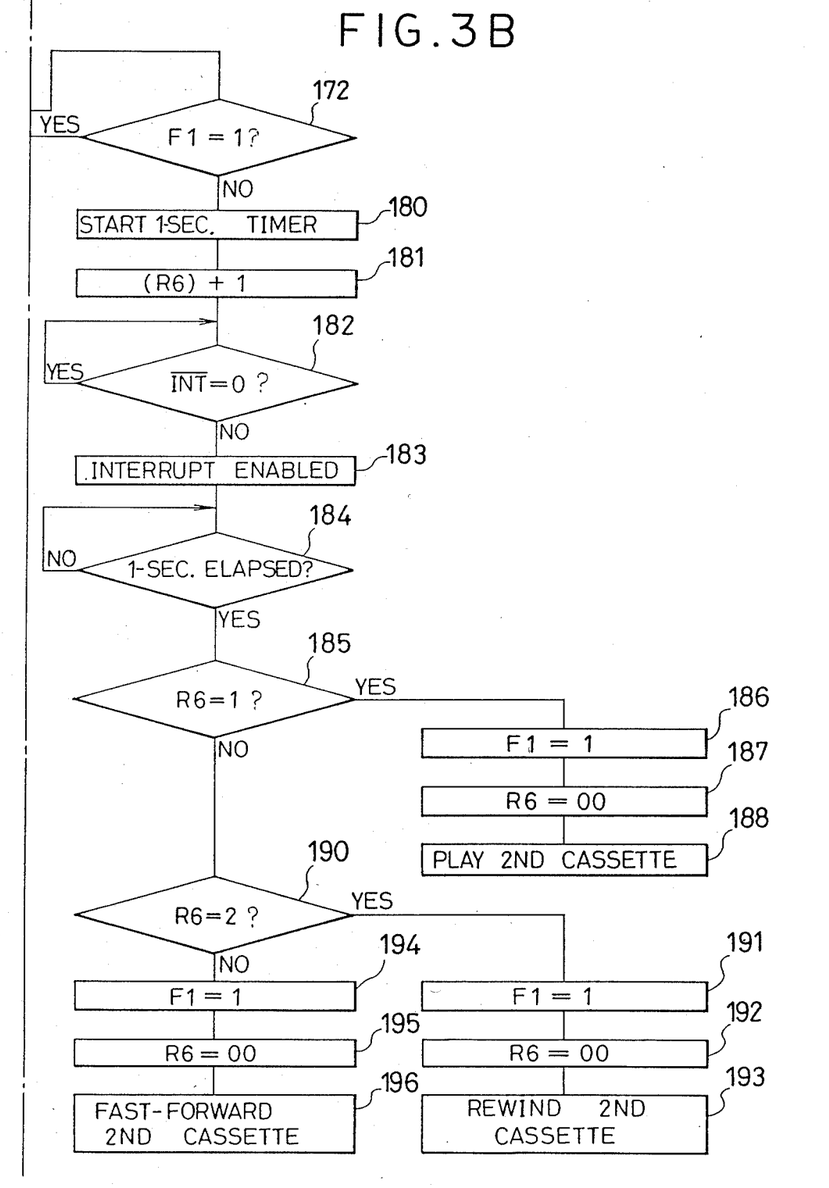

FIG. 3 shows a program for control of the second cassette, wherein the R6 register is used as a counter for storing a number by which the second operation button 2 is depressed, whereas the F1 flag is employed for indicating that the second cassette is being operated. Since the program of FIG. 3 is substantially the same as that of FIG. 2, a detailed explanation thereof is omitted. However, it is apparent from steps 153,170 and 171 that simultaneous operation of buttons 2 and 3 corresponding to data 110B (see switch data positions 2,3,1 respectively in FIG. 1A) controls recording on the second cassette.

Figures 4, 4A:
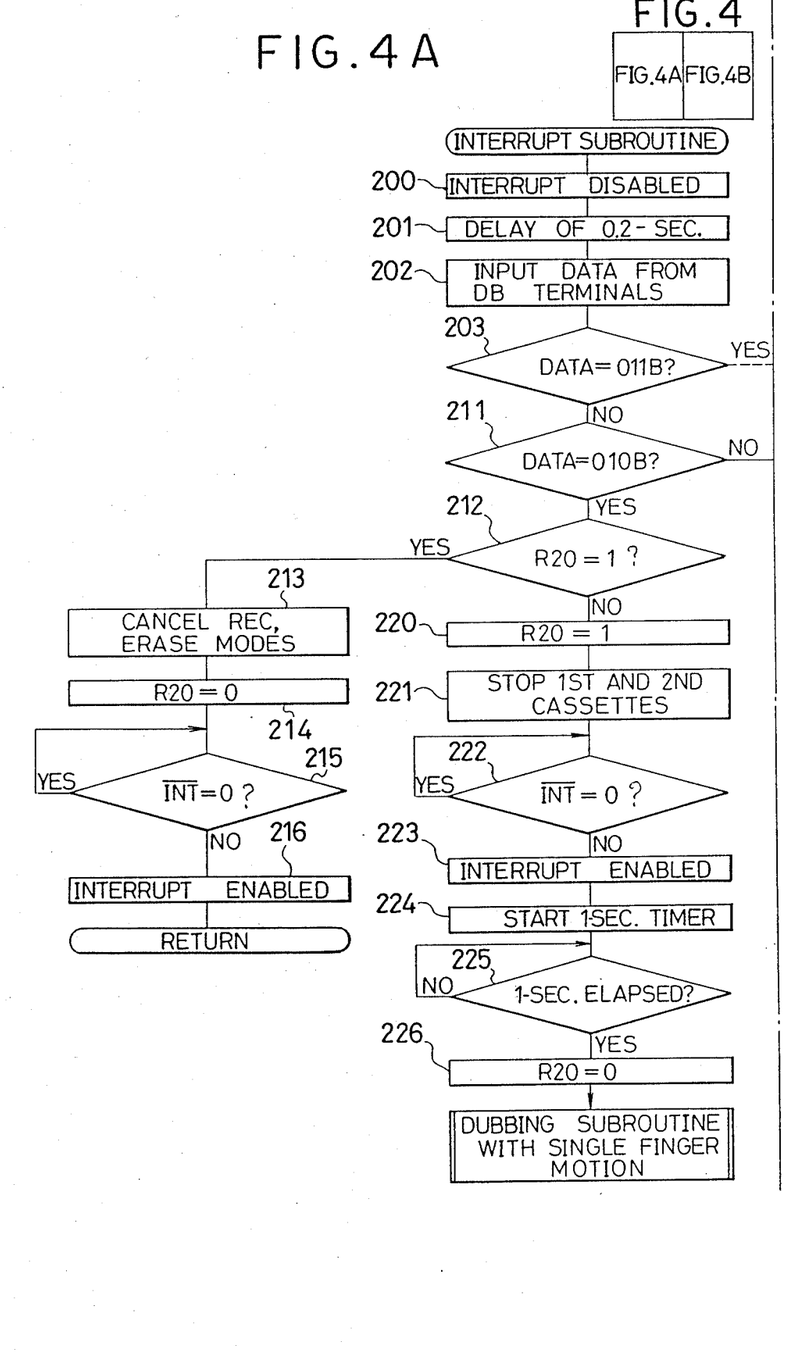
Figure 4B:
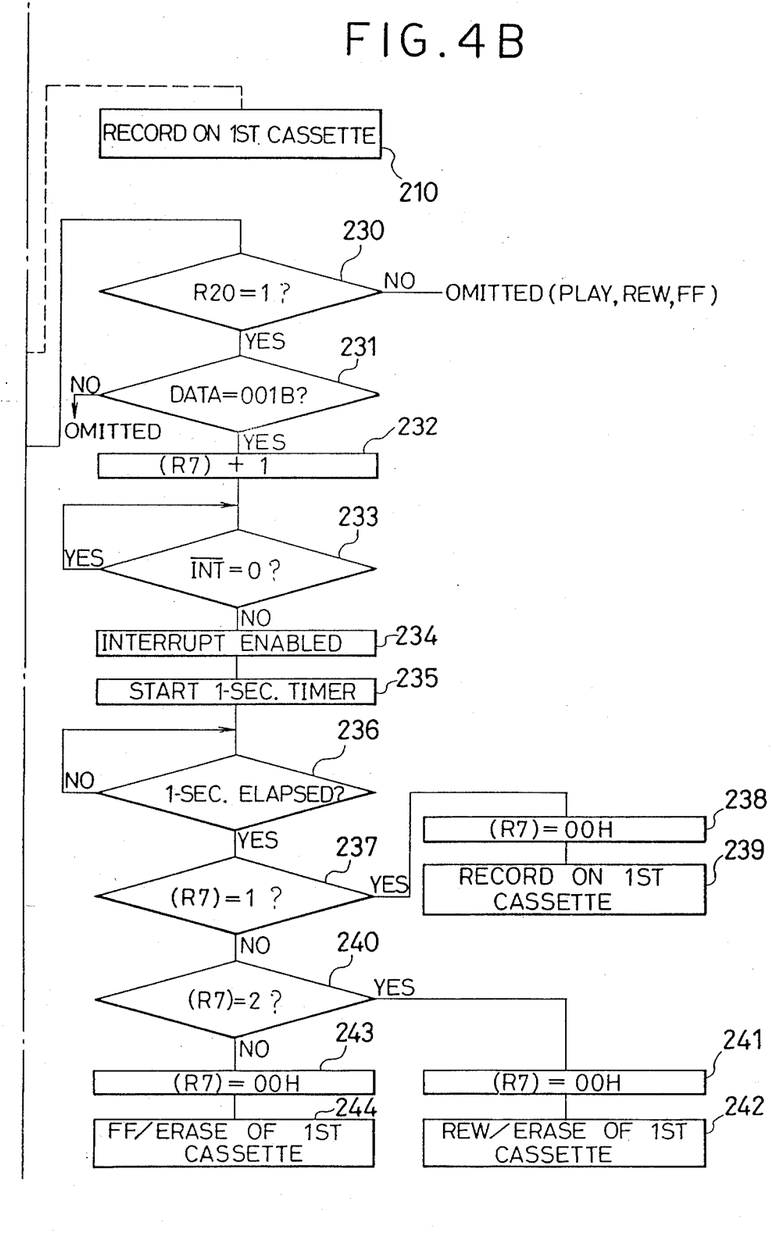

FIG. 4 shows a program for recording, rewind erasure, and fast-forward erasure operations of the first and second cassettes effected upon sequential depression of the first, second and third operation buttons 1, 2 and 3.

In the following, operations for operating the first cassette in recording mode will be first exemplarily explained. When the user depresses the third operation button 3, an interrupt request is supplied to the CPU 30 as mentioned above, the CPU 30 disables interrupts at step 200, and performs input processing of the coded data from the data bus terminals DB0 to DB2 (step 202) after elapse of the period of time of 0.2 seconds (step 201). As mentioned above, the coded data "010B" appears at the terminals so long as the third operation button 3 is depressed, and thus the program advances from step 211 to step 212 through step 203. At step 212, the contents of the zero bit of a R2 register (hereinafter, referred to as a R20 register) serving as a flag is tested. Since the R20 register is arranged so that it is cleared when electric power is turned on to the device of FIG. 1, or when a series of operations (to be described later) is completed, the program flows from step 212 to step 220 so that the R20 register is set to "1". After causing the first and second cassettes to stop at step 221, the CPU 30 tests whether the third operation button 3 is depressed, at step 222. Upon release of the depressed button 3, CPU 30 enables interrupts. Accordingly, if the first operation button 1 is depressed before 1 second has elapsed (step 225) from the time a 1-second timer is started at step 224, the program advances to step 231 through steps 200 through 203 and steps 211 and 230, so that the CPU 30 tests whether the first operation button 1 is being depressed. At this time, since it is determined that the inputted data is consistent with the predetermined data "001B", the program advances to step 232, wherein the content of the R7 register is incremented by +1 to set the same content to "1". At steps 233 to 236, the CPU 30 checks whether the depressed operation button 1 is released or not, and thereafter the 1-second timer is started, as is steps 222 through 225. Unless any one of other operation buttons is depressed within one second, no interrupt request is supplied to the CPU 30, and thus the program advances from step 236 to step 237 in which the CPU 30 tests if the value stored in the R7 register is equal to "1". As is apparent from the foregoing explanation, since the value counted by the R7 register is "1", the program advances to step 238 to clear the R7 register for subsequent operation, and then the first cassette is driven in recording mode.

On the other hand, in order to erase contents recorded on the first cassette, with the same cassette being rewound, i.e., to effect rewind/erasure operation of the same cassette, the user depresses the third operation button 3 and release the same button and then depresses the first operation button 1 twice. As a result, at step 232, the value of the R7 register is incremented to "2". At step 240 that the counted value is checked and found consistent with the predetermined value of "2", causing the program to proceed to step 242 through step 241, so that the content of the first cassette is erased, with the same cassette rewound.

In order to erase the first cassette while in fast-forward, i.e., to effect fast-forward/erasure operation of the first cassette, the user depresses the third operation button 3 and release the same button and then depresses the first operation button 1 three times or more. As a result, the program advances from step 240 to step 243 and then to step 244 so that the first cassette undergoes fast-forward erasure operation, as is apparent from the foregoing explanations.

Further, to terminate the above-mentioned recording, rewind/erasure, and fast-forward/erasure operations, the user depresses the third operation button 3 again. As a result, an interrupt request is supplied to the CPU 30, and thus the program advances to step 212 through steps 200 to 203 and step 211. At step 212, the CPU 30 tests the content of the R20 register. Since the R20 register has been set at logic "1" at previous step 220, the program proceeds from step 212 to step 213, so that recording and erasing operations are terminated, respectively, and further the the R20 register is cleared for subsequent operations (step 214). Thereafter, the program executes steps 215 and 216, and then exits from this resetting or release subroutine. In the meantime, the resetting operation may be so arranged that it is executed upon depression of either one of the operation buttons 1 and 2 for the first and second cassette, as explained with reference to FIGS. 2 and 3.

In the program of FIG. 4 the recording operation, etc. are carried out upon sequential depressions of the operation buttons, whereas in FIG. 2 the recording operation is performed upon similtaneous depressions of two operation buttons, as mentioned above. Accordingly, the user may selectively utilize either one of these methods of operation as desired, because the CPU 30 can positively determine the thus selected manner of operation on the basis of the inputted coded data.

In FIG. 4 for sequential button operations, step 203 is provided for determining whether or not the first and third operation buttons 1 and 3 are depressed simultaneously. Although intervening steps between step 203 and step 210, if the simultaneous depressions are detected at step 203, the program flows to step 210 so that the first cassette is driven in recording mode.

Although omitted in the drawings, the control program may be so prepared that the second cassette is driven in selected one of recording, rewind/erasure and fast-forward/erasure modes, respectively, upon simultaneous depression of the operation buttons 1 and 2 by respective predetermined numbers of times of depression. Further, the program may be so modified that rewind/erasure and fast-forward/erasure operations are carried out, respectively, upon depressions of the operation buttons by respective predetermined numbers of times of depression, with operation button 3 continuously depressed.

In the following, dubbing operation effected by a single finger motion will be explained, part of steps for such operation being illustrated in FIG. 4.

When the user depresses the third operation button 3, the program advances to step 225 through steps 200, 201, 220 to 224 of FIG. 4. If it is determined at step 225 that the 1 second has elapsed, the R20 register is cleared at step 226 and then the program advances to step 300 in FIG. 5. The CPU 30 determines whether the the edit switch 13, which is connected to the data bus terminal DB4 (FIG. 1) of the CPU 30, is ON or OFF, at step 300. If it is determined that the same switch is ON, the CPU 30 sets the R27 register (the seventh digit of the R7 register) to logic "1" at step 301. Next, at step 302, the CPU 30 tests if the synchronous switch 12 connected to the data bus terminal DB4 is ON or OFF.

Figure 5A:
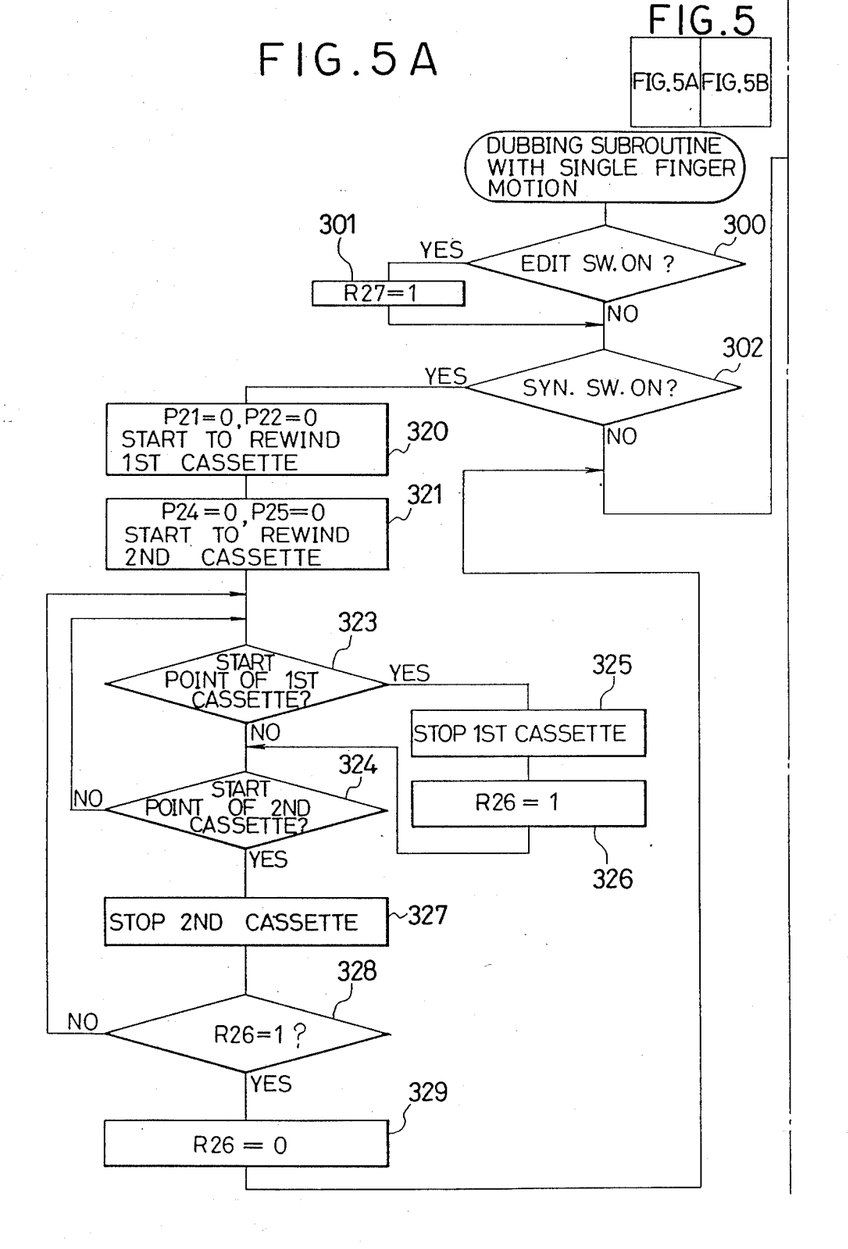
Figure 5B:
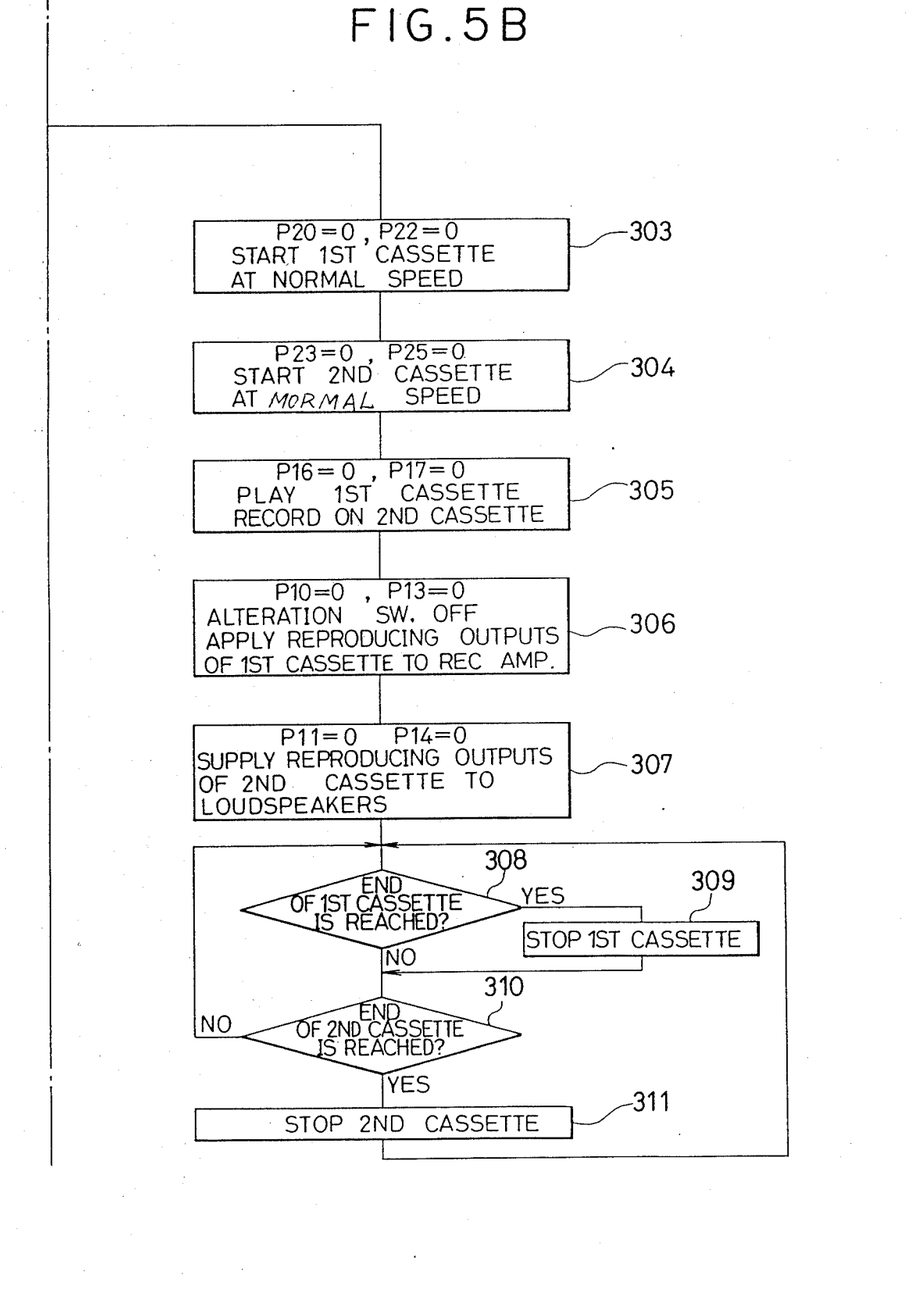

If it is determined that the synchronous switch 12 is OFF, the program advances from step 302 to step 303 to drive the first cassette or the master tape at a normal speed. Next, the CPU 30 operates to drive the second cassette or the slave tape at a normal speed at step 304, and then sets both of the output ports P16 and P17 of the CPU 30 to logic "0" the internal. With ports P16 and P17 at logic "0" logic of recording/playing switching circuit 14 is so switched as to operate the heads for the first cassette in playing mode and the heads for the second cassette in recording mode, respectively. Further, the CPU 30 sets both of the output ports P10 and P13 at logic "1" to turn the analog switches A-1 and A-5 on, and turn the analog switches A-2 and A-6 off. Thus, stereophnic sound reproducing outputs from the first cassette are supplied to the recording amplifiers 16 and 19, which in turn recorded on the second cassette through the switching circuit 14 and the recording/playing heads. At step 307, CPU 30 sets output ports P11 and P14 to logic "0", turning analog switches A-4 and A-8 on. This allows the user to monitor the reproducing outputs from the first cassette through the loudspeakers 22, 23 to which the outputs are supplied through the power amplifiers 17 and 20, respectively. Further, at steps 308 through 311, CPU 30 determines whether the first and second cassettes are driven up to their ends, respectively. If it is determined that each cassette end is reached, the CPU 30 operates to terminate movement of the corresponding cassette. Alternatively, when either one of the cassette ends is reached, the CPU 30 stop both of the cassettes.

On the other hand, if it is determined that synchronous switch 12 is ON, the program flows from step 302 to step 320. At step 320, the first cassette is driven in rewinding mode, and at subsequent step 321 the second cassette is rewound. Accordingly, the two cassettes are rewound simultaneously, with CPU 30 testing whether or not the the respective start points of the two cassettes are reached, at steps 323 and 324. Depending on the situation, either one of the first and second cassettes is rewound to its start point ealier than another cassette. Because of this, the program causes CPU 30 to stop the first cassette and sets a R26 register serving as a flag to logic "1" (steps 325, 326), if the start point of the first cassette is reached first. The content of the R26 register is checked at subsequent step 328, so that the program advances to step 303, after the respective start points of these cassettes are reached, through step 329 at which the R26 register is cleared. In order to terminate the dubbing operation before the end of the cassette is detected, the user depresses the third operation button 3 again, or instance, as mentioned with reference to FIG. 4.

What is claimed is:

1. An easily operable recording/reproducing apparatus of a double cassette type, comprising:
    a first operation button consisting of a single button which is adapted to be repetitively depressed for selecting one of reproducing, rewinding, and fast-forwarding manual operations of a master tape;
    a second operation button consisting of a single button which is adapted to be repetitively depressed for selecting one of reproducing, rewinding, and fast-forwarding manual operations of a slave tape;
    a third operation button for a dubbing operation from said master tape to said slave tape,
    means for controlling said dubbing operation in response to a single depression of said third operation button; and
    means for performing recording on said slave tape in response to a simultaneous depression of said second and third operation buttons.

2. An apparatus according to claim 1, wherein said master tape is driven in playing back, rewinding, and fast-forwarding modes when said first operation button is depressed once, twice, and three times, respectively, and said slave tape is driven in playing back, rewinding, and fast-forwarding modes when said second operation button is depressed once, twice, and three times, respectively.

3. An apparatus according to claim 1, wherein a recording operation of one of two tapes is performed when said third button and one of the other two buttons are depressed.

* * * * *